United States Patent
Chiang

(10) Patent No.: US 7,993,129 B2
(45) Date of Patent: Aug. 9, 2011

(54) INJECTION MOLDING MACHINE

(75) Inventor: Chenyuen Chiang, Hong Kong (CN)

(73) Assignee: Chen Hsong Asset Management Limited, Hong Kong (CN)

( * ) Notice: Subject to any disclaimer, the term of this patent is extended or adjusted under 35 U.S.C. 154(b) by 0 days.

(21) Appl. No.: 12/665,536

(22) PCT Filed: Jun. 19, 2008

(86) PCT No.: PCT/CN2008/001194
§ 371 (c)(1),
(2), (4) Date: Jan. 15, 2010

(87) PCT Pub. No.: WO2009/000152
PCT Pub. Date: Dec. 31, 2008

(65) Prior Publication Data
US 2010/0173039 A1  Jul. 8, 2010

(30) Foreign Application Priority Data

Jun. 26, 2007 (CN) .......................... 2007 1 0123007

(51) Int. Cl.
*B29C 45/64* (2006.01)
(52) U.S. Cl. ...................................... 425/589; 425/595
(58) Field of Classification Search .............. 425/450.1, 425/451.9, 589, 595
See application file for complete search history.

(56) References Cited

U.S. PATENT DOCUMENTS

| | | | | |
|---|---|---|---|---|
| 2,862,238 A | * | 12/1958 | Cuzzi | 425/451.2 |
| 3,669,599 A | * | 6/1972 | Snider et al. | 425/595 |
| 3,729,283 A | * | 4/1973 | Eggenberger et al. | 425/595 |
| 5,178,888 A | | 1/1993 | Wuerl | |
| 5,407,342 A | * | 4/1995 | Boucher et al. | 425/595 |
| 6,231,329 B1 | * | 5/2001 | Van Keuren, III | 425/595 |
| 6,524,091 B2 | * | 2/2003 | Romi | 425/595 |
| 6,733,275 B2 | * | 5/2004 | Fujita | 425/595 |

FOREIGN PATENT DOCUMENTS

| | | |
|---|---|---|
| CN | 2173692 | 8/1994 |
| CN | 2186650 | 1/1995 |
| CN | 2552679 | 5/2003 |
| CN | 2900138 | 5/2007 |
| CN | 201080000 | 7/2008 |
| EP | 1 238 777 A1 | 9/2002 |
| JP | 52 000407 U | 1/1977 |
| JP | 6154989 | 6/1994 |
| JP | 2002225100 | 8/2002 |
| JP | 2003 311796 A | 11/2003 |

* cited by examiner

*Primary Examiner* — James Mackey
(74) *Attorney, Agent, or Firm* — Muncy, Geissler, Olds & Lowe, PLLC

(57) ABSTRACT

An injection molding machine includes a lock nut open-close mechanism provided on a moveable platen (1) to engage with at least two tie bars (3), and comprises a pair of rods (23, 24) connecting two pairs of lock nuts (21, 22), and a clamping unit (2). The clamping unit comprises an execution element (25) and a pair of connecting bars for open-close action (26, 27) symmetrically arranged. A first end of a first connecting bar (26) is connected to the second nut (212) of the first pair of lock nuts (21), and a first end of the second connecting bar (27) is connected to the first nut (221) of the second pair of lock nuts (22). The second ends of the first and second connecting bars are connected to each other and are driven by the execution element (25) simultaneously to open or close the pairs of lock nuts simultaneously.

3 Claims, 2 Drawing Sheets

INJECTION MOLDING MACHINE

This application is a national stage of International Application No.: PCT/CN2008/001194, which was filed on Jun. 19, 2008, and which claims priority to Chinese Application No.: 200710123007.2, which was filed in China on Jun. 26, 2007, and which are both herein incorporated by reference.

FIELD OF THE INVENTION

The present invention relates to a device for plastic injection molding, especially relates to an injection molding machine. More particularly, the present invention relates to a mold open-close device for the injection molding machine.

BACKGROUND OF THE INVENTION

Devices for plastic injection molding employ various mold open-close devices. For example, a double-plate mold closing mechanism is employed in the mold closing mechanism of a double-plate injection molding machine, as disclosed in Chinese patent CN2186650. The mold closing mechanism comprises a moveable platen, a fixed platen and four tie bars arranged between the moveable platen and the fixed platen. Each of the tie bars is provided with a pair of flashboards at the side adjacent to the fixed platen. Two sets of clamping devices are provided with one located between two of the pairs of flashboards and the other located between the other two pairs of flashboards. The clamping devices are provided horizontally, and the two pairs of flashboards connected with the clamping devices are also provided horizontally. Each pair of flashboards is composed of a flashboard on the left and a flashboard on the right. The flashboard on the left comprises a left end surface vertical to the horizontal plane and a right arc surface matching the surface of the tie bar, and the flashboard on the right comprises a right end surface vertical to the horizontal plane and a left arc surface matching the surface of the tie bar. The two left flashboards of the two pairs are connected by a stud, and the two right flashboards are connected by another stud. The clamping device comprises a hydraulic cylinder, which is fixed directly to the right end surface of the right flashboard of the left pair, while the piston rod of the hydraulic cylinder is fixed directly to the left end surface of the left flashboard of the right pair. The hydraulic cylinder is controlled to drive the piston rod to extend or contract so that the left and right flashboards of each pair may be driven to move towards the surface of the tie bar simultaneously to close the flashboards, or to move against the surface of the tie bar simultaneously to open the flashboards. And the heads of the four tie bars are respectively provided with a notch corresponding to the flashboards for securing the position of the tie bars and the flashboards. Also, a double-plate combined with direct-driving mold clamping structure is disclosed by Chinese patent CN2737532. The structure comprises a fixed platen, a moveable platen and four tie bars connected with the fixed platen and the moveable platen. Cogs are configured to be around the periphery of an end portion of each tie bar. A clamping unit is provided on each pillar adjacent to the moveable platen. The clamping unit is constructed by arranging two clamping blocks inside a clamping base. The opposite faces of the two clamping blocks are configured to have shrinking openings corresponding to the periphery of tie bar. The inner sides of the shrinking openings are provided with teeth engaging the cogs. A hydraulic cylinder is provided outside the clamping blocks, and a guide bar is provided inside the two opposite clamping blocks so that two clamping blocks are driven to open or close when the hydraulic cylinder operates.

It can be seen that the movable platen and the tie bars' axis (i.e., the moving direction of the mold) of the existing injection molding machine are orientated by lock nuts which are directly driven by a hydraulic cylinder. The clamping force of the nuts is directly provided by the hydraulic cylinder. Thus, the claiming force depends directly on the size of the hydraulic cylinder. With this structure, a large size of the hydraulic cylinder is required in order to provide large driving force. That not only increases the production cost but also causes a waste of energy.

SUMMARY OF THE INVENTION

An object of the present invention is to provide a novel open-close mechanism of lock nut for an injection molding machine to overcome the defects of the prior art. The mechanism can be driven by small execution element with reduced production cost and low energy consumption.

For the purpose of achieving the object, the present invention provides an injection molding machine comprising a moveable platen, a fixed platen, at least two tie bars arranged between the moveable platen and the fixed platen for having the moveable platen move thereon and an open-close mechanism of lock nut provided on the periphery of the end adjacent to the moveable platen to engage with each tie bar. The open-close mechanism of lock nut comprises two pairs of lock nuts, at least one clamping unit and a pair of rods for connecting the pairs of lock nuts, wherein the two pairs of lock nuts are provided on the same horizontal plane or on the same vertical plane. A first nut of a first pair of lock nuts is connected to a first nut of a second pair of lock nuts by a first rod, and a second nut of the first pair of lock nuts is connected to a second nut of the second pair of lock nuts by a second rod. The clamping unit further comprises an execution element and a pair of connecting bars for open-close action symmetrically arranged. A first end of a first connecting bar for open-close action is connected to the second nut of the first pair of lock nuts. A first end of a second connecting bar for open-close action is connected to the first nut of the second pair of lock nuts. A second end of the first connecting bar for open-close action is connected to a second end of the second connecting bar for open-close action. The second end of the first connecting bar for open-close action and the second end of the second connecting bar for open-close action are driven by the execution element simultaneously to open or close the first pair of lock nuts and the second pair of lock nuts simultaneously.

In comparison with the prior art, the open-close mechanism of lock nut for the injection molding machine according to the present invention can reduce production cost and energy consumption.

BRIEF DESCRIPTION OF THE DRAWINGS

The present invention will be further described with reference to the drawings and the following embodiments.

DETAILED DESCRIPTION OF EMBODIMENTS

Figure 1:
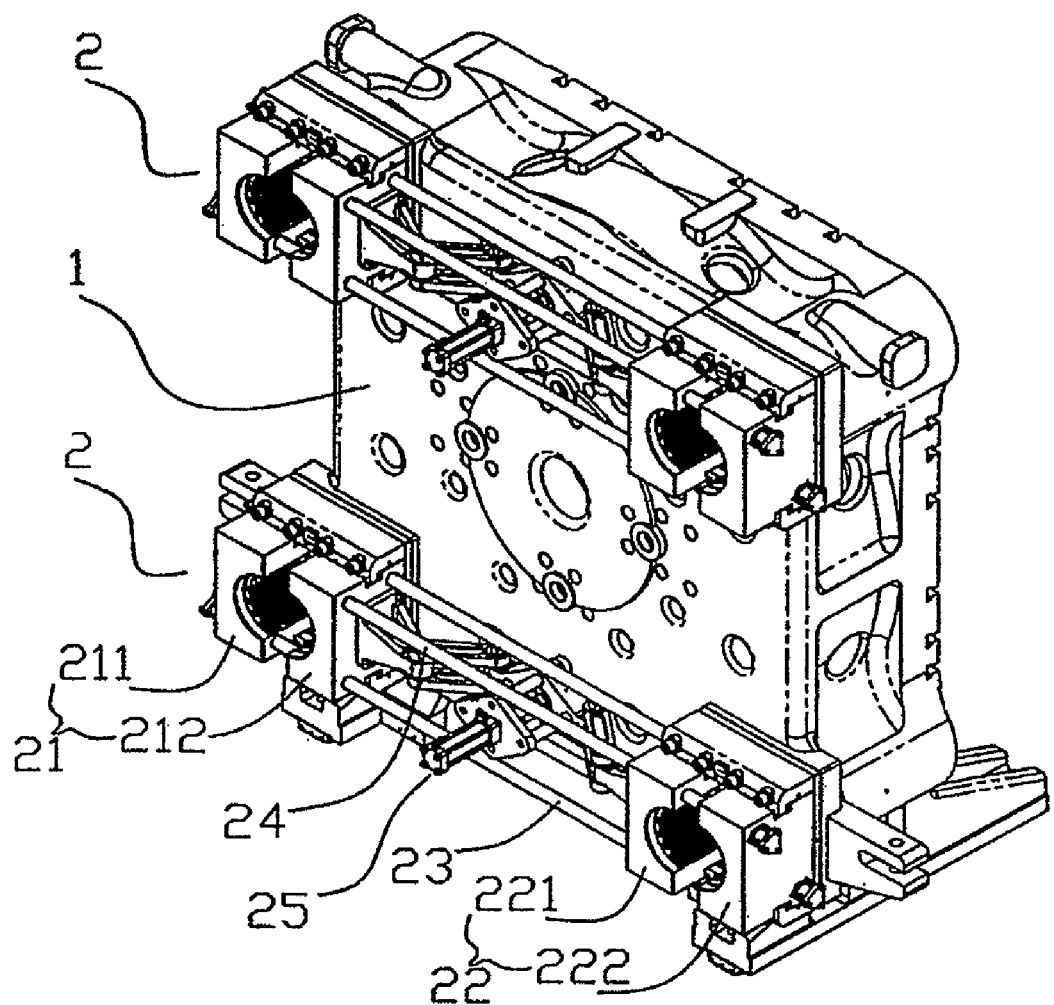
FIG. 1 is an integral schematic view of an open-close mechanism of lock nut in an injection molding machine according to an embodiment of the present invention.
Figure 2:
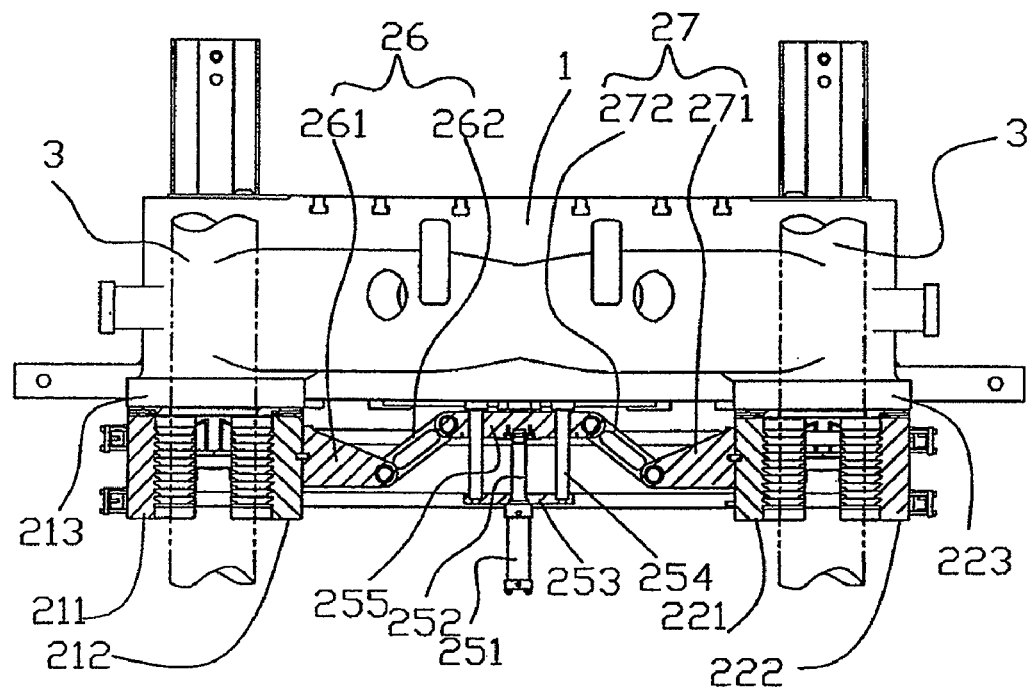
FIG. 2 is a schematic front view of an open-close mechanism of lock nut in an injection molding machine according to an embodiment of the present invention.
Figure 3:
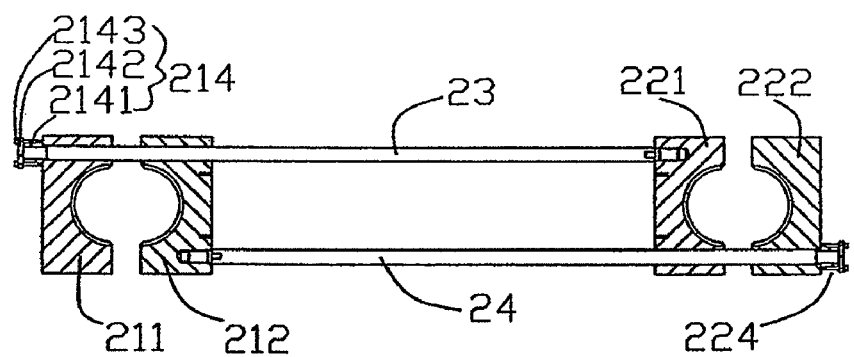
FIG. 3 is a schematic view showing the connection of the two pairs of lock nuts employed by an embodiment of open-

An embodiment of an open-close mechanism of lock nut for an injection molding machine according to the present invention is shown in FIGS. 1 to 3. The mold closing mechanism for the injection molding machine comprises a moveable platen 1, a fixed platen (not shown) and at least two tie bars 3 arranged between the moveable platen 1 and the fixed platen for having the moveable platen 1 move thereon. Cogs are configured to be around the periphery of the end of the tie bars 3 adjacent to the moveable platen 1. The open-close mechanism of lock nut comprises at least one clamping unit 2 located at the moveable platen 1 and corresponding to the two tie bars 3 on the same plane. The clamping unit 2 comprises two pairs of lock nuts 21, 22 respectively corresponding to the two pull rods tie bars 3 and a pair of rods 23, 24 for connecting the two pairs of lock nuts 21, 22. Shrinking openings are provided on the opposite surfaces of each pair of lock nuts to correspond to the periphery of the tie bar 3. Gear teeth matching the shape of the cogs of the tie bar 3 are provided on the interior of the shrinking openings. The two pairs of lock nuts 21, 22 are provided on the same plane, wherein the first nut 211 of the first pair of lock nuts 21 has the same opening orientation as the first nut 221 of the second pair of lock nuts 22, and the second nut 212 of the first pair of lock nuts 21 has the same opening orientation as the second nut 222 of the second pair of lock nuts 22. The first nut 211 of the first pair of lock nuts 21 is connected to the first nut 221 of the second pair of lock nuts 22 by the first rod 23, and the second nut 212 of the first pair of lock nuts 21 is connected to the second nut 222 of the second pair of lock nuts 22 by the second rod 24. The clamping unit 2 further comprises an execution element 25 and a pair of connecting bars 26, 27. A first end of the first connecting bar 26 is connected to the second nut 212 of the first pair of lock nuts 21, and a first end of the second connecting bar 27 is connected to the first nut 221 of the second pair of lock nuts 22. A second end of the first connecting bar 26 is connected to a second end of the second connecting bar 27. The second end of the first connecting bar 26 and the second end of the second connecting bar 27 are driven by the execution element 25 to simultaneously open or close the first pair of lock nuts 21 and the second pair of lock nuts 22. When the first pair of lock nuts 21 and the second pair of lock nuts 22 are closed, the first connecting bar 26 and the second connecting bar 27 are in the self-locking state.

In fact, two pairs of lock nuts 21, 22 are provided on the same horizontal plane. As shown in the FIG. 1, the amount of the tie bars 3 is four, and the amount of the clamping units 2 is two. And the two clamping units 2 are configured to be in parallel. Certainly, the two pairs of lock nuts may be arranged on the same vertical plane.

The execution element 25 comprises a hydraulic cylinder 251 which is fixed on the moveable platen 1. The piston rod 252 of the hydraulic cylinder 251 is connected with the second end of the first connecting bar 26 and the second end of the second connecting bar 27.

The hydraulic cylinder 251 is fixed on the moveable platen 1 by a flange 253 and a crosshead guide bar 254. As shown in FIG. 1, four guide bars 254 are provided in parallel with an end fixed on the moveable platen respectively. The piston rod 252 of the hydraulic cylinder 251 is connected to the crosshead 255. The crosshead 255 comprises two connecting ends, the first connecting end is connected to the second end of the first connecting bar 26, and the second connecting end is connected to the second end of the second connecting bar 27.

Certainly, the execution element 25 may also be any other element that can have the crosshead 255 move, such as air cylinder, electric screw or the like.

The first connecting bar 26 comprises a first arm 261 and a second arm 262. One end of the first arm 261 is fixed to the second nut 212 of the first pair of lock nuts 21, and one end of the second arm 262 is hinged to the first connecting end of the crosshead 255. The opposite ends of the first arm 261 and the second arm 262 are hinged together. The second connecting bar 27 comprises a first arm 271 and a second arm 272. One end of the first arm 271 is fixed to the first nut 221 of the second pair of lock nuts 22, and one end of the second arm 272 is hinged to the second connecting end of the crosshead 255. The opposite ends of the first arm 271 and the second arm 272 are hinged together.

The first pair of lock nuts 21 is mounted to the moveable platen 1 by a pinch plate 213, and the second pair of lock nuts 22 is mounted to the moveable platen 1 by a pinch plate 223.

As shown in FIG. 3, the first rod 23 engages with the first nut 221 of the second pair of lock nuts 22 by mating the threaded structure at one end with the threaded hole in the first nut 221, and the opposite end of the first rod 23 extends through the perforations in the first nut 211 and the second nut 212 of the first pair of lock nuts 21 to engage with a fixed element 214 by mating the thread thereon with the threaded structure of the fixed element 214. The fixed element 214 comprises a nut 2141, a pressure plate 2142 and a bolt 2143. Similarly, the second rod 24 engages with the second nut 212 of the first pair of lock nuts 21 by mating the threaded structure at one end with the threaded hole in the second nut 212, and the opposite end of the second rod 24 extends through the perforations in the first nut 221 and the second nut 222 of the second pair of lock nuts 22 to engage with a fixed element 224 by mating the thread thereon with the threaded structure of the fixed element 224. The fixed element 224 comprises a nut, a pressure plate and a bolt.

The open-close mechanism of lock nut of the injection molding machine according to the embodiment of the present invention can achieve synchronized motion by fixing two pairs of lock nuts with one pair of rods. With the arrangement of a pair of rods, the open-close force from the execution element may be amplified so that the requirement for the execution element decreases. By designing the rod motion curve, the technical demand for large locking force and low motion speed may be satisfied when the lock nut clamps the tie bars. The safe and reliable clamping action may be ensured in the self-lock state after the lock nut clamps the tie bars. By adjusting the connecting position between the rod and the lock nut, the gap between the lock nut and tie bar can be controlled precisely after the lock nut is clamped, which can prevent the damage therebetween.

The content set forth above is only the preferable embodiments of the present invention, and it should not been interpreted as limitations to the present invention. Modifications and variations would be made by those skilled in the art after perusal of this application without departing from the spirit and principle of the present invention. Therefore, the protection scope of the present invention should be defined by the claims.

What is claimed is:

1. An injection molding machine comprising a moveable platen, a fixed platen, at least two tie bars arranged between the moveable platen and the fixed platen to have the moveable platen move thereon and an open-close mechanism of lock nut provided on the periphery of one end of the moveable platen to engage with the respective tie bar, wherein the open-close mechanism of lock nut comprises two pairs of lock nuts, at least one clamping unit and a pair of rods for connecting the pairs of lock nuts; the two pairs of lock nuts are provided at the same horizontal plane or the same vertical plane; a first nut of a first pair of lock nuts is connected to a first nut of a second pair of lock nuts by a first rod, a second nut of the first pair of lock nuts is connected to a second nut of the second pair of lock nuts by a second rod, wherein:

the clamping unit further comprises an execution element and a pair of connecting bars for open-close action symmetrically arranged;

a first end of a first connecting bar for open-close action is connected to the second nut of the first pair of lock nuts, and a first end of a second connecting bar for open-close action is connected to the first nut of the second pair of lock nuts;

a second end of the first connecting bar for open-close action is connected to a second end of the second connecting bar for open-close action, and the second end of the first connecting bar for open-close action and the second end of the second connecting bar for open-close action are driven by the execution element simultaneously to open or close the first pair of lock nuts and the second pair of lock nuts simultaneously, wherein:

the execution element comprises a hydraulic cylinder, a crosshead and a plurality of guide bars in parallel;

the plurality of guide bars are fixed on the moveable platen;

the hydraulic cylinder is fixed on the moveable platen by the plurality of guide bars;

a piston rod of the hydraulic cylinder is vertically fixed at the center of the crosshead;

the crosshead is movable along the axis of the plurality of guide bars;

the first connecting bar for open-close action comprises a first arm and a second arm, a first end of the first arm is fixed to the second nut of the first pair of lock nuts, and a first end of the second arm of the first connecting bar is hinged to a first connecting end of the crosshead, a second end of the first arm of the first connecting bar is hinged to a second end of the second arm of the first connecting bar; and the second connecting bar for open-close action comprises a first arm and a second arm, a first end of the first arm of the second connecting bar is fixed to the first nut of the second pair of lock nuts, a first end of the second arm of the second connecting bar is hinged to a second connecting end of the crosshead, a second end of the first arm of the second connecting bar is hinged to a second end of the second arm of the second connecting bar.

2. The injection molding machine according to claim 1, wherein:

each pair of lock nuts is openable and closable mounted on the moveable platen with a pinch plate.

3. The injection molding machine according to claim 1, wherein:

the amount of the tie bars is four;

the amount of the clamping units is two; and both of clamping units are arranged in parallel.

\* \* \* \* \*